United States Patent
Gomez et al.

(10) Patent No.: US 8,012,883 B2
(45) Date of Patent: Sep. 6, 2011

(54) STRIPPING METHOD

(75) Inventors: Luis A. Gomez, Holden, MA (US);
Jason A. Reese, Londonderry, NH (US)

(73) Assignee: Rohm and Haas Electronic Materials LLC, Marlborough, MA (US)

(*) Notice: Subject to any disclaimer, the term of this patent is extended or adjusted under 35 U.S.C. 154(b) by 982 days.

(21) Appl. No.: 11/897,383

(22) Filed: Aug. 29, 2007

(65) Prior Publication Data

US 2008/0053956 A1    Mar. 6, 2008

Related U.S. Application Data

(60) Provisional application No. 60/840,927, filed on Aug. 29, 2007.

(51) Int. Cl.
*H01L 21/302* (2006.01)
(52) U.S. Cl. ......... 438/754; 438/745; 438/751; 216/100
(58) Field of Classification Search ........... 438/745, 438/750, 754, 751; 216/97, 103; 252/79.4
See application file for complete search history.

(56) References Cited

U.S. PATENT DOCUMENTS

| | | | |
|---|---|---|---|
| 5,972,123 A * | 10/1999 | Verhaverbeke | 134/3 |
| 6,224,805 B1 | 5/2001 | Fields et al. | |
| 6,455,479 B1 | 9/2002 | Sahbari | |
| 6,780,784 B2 | 8/2004 | Jo et al. | |
| 7,554,645 B2 * | 6/2009 | Kwon | 349/187 |
| 2002/0013240 A1 * | 1/2002 | Sahbari | 510/176 |
| 2004/0118814 A1 | 6/2004 | Kim et al. | |
| 2004/0203181 A1 | 10/2004 | Shang et al. | |
| 2004/0242000 A1 | 12/2004 | Jo et al. | |
| 2007/0020910 A1 * | 1/2007 | Park et al. | 438/612 |

FOREIGN PATENT DOCUMENTS

| | | |
|---|---|---|
| EP | 1 693 484 A2 | 8/2006 |
| WO | WO 03/005115 A1 | 1/2003 |

* cited by examiner

*Primary Examiner* — Lan Vinh
(74) *Attorney, Agent, or Firm* — S. Matthew Cairns

(57) ABSTRACT

Methods are provided for manufacturing optical display devices which remove an etch resist and residual post-etch metal in a single step. These methods are particularly useful in the manufacture of LCDs.

15 Claims, No Drawings

STRIPPING METHOD

The present invention relates to the field of removal of polymeric and metallic materials from a substrate. In particular, the present invention relates to methods for the removal of residues remaining after etching of metal layers in the manufacture of display devices.

In the manufacture of display devices, metal layers are disposed on an optically transparent substrate. Typically, such metal layers are patterned to provided metal lines (or circuit traces). One way to define such metal lines is by etching away unwanted portions of the metal layer. The etching process typically includes the step of disposing a layer of a suitable etch resist on the metal layer and defining a pattern in the etch resist. This can be readily accomplished by using a photoresist as the etch resist. The photoresist can be patterned by exposing the photoresist to actinic radiation of a suitable wavelength through a mask followed by development of the photoresist. Unwanted portions of the photoresist are removed, exposing the underlying metal layer. Contact of the metal layer with a suitable etching composition removes the exposed metal, i.e. that portion of the metal layer that is not coved by the photoresist. Next, the remaining photoresist covering the desired portions of the metal layer is removed (or stripped) to provide metal lines on the transparent substrate.

It is important to maintain the critical dimensions of the metal lines and the spaces between such lines during the manufacture of display devices. Over-etching of the metal layer may remove too much of the metal and undercut the metal covered by the photoresist, thus changing the critical dimension of the metal line or spacing between the metal lines. When the optically transparent substrate is glass, over-etching of the metal layer may also etch the substrate itself. If the metal layer is insufficiently etched, then a film or residue of metal may remain on the substrate which may result in failures of the display device due to shorts. In conventional display device manufacture, the etching step to define metal lines must be controlled to remove the desired amount of metal while not substantially changing the critical dimensions of the metal lines or spaces. Such control may be achieved by adjusting the etching process only after devices having metal residue or substantially changed critical dimensions are produced. There is a need for an etching process that removes the desired amount of metal without substantially changing the critical dimensions of the metal lines and spaces.

The present invention provides a method of etching a metal layer including: providing a substrate having a metal layer disposed thereon; disposing an etching resist on the metal layer; patterning the etching resist to expose areas of metal; contacting the exposed areas of metal with a wet etching composition to remove a portion of the exposed metal; and contacting the substrate with a stripping composition to remove the etching resist and the remaining exposed metal; wherein the substrate is an optically transparent substrate and wherein the stripping composition includes a polyhydric alcohol, water, a water-miscible amine and a polar solvent. As used herein, "wet etching" refers to chemical etching and does not include dry (plasma) etching.

The present invention further provides a method of manufacturing a display device including: providing a substrate having a metal layer disposed thereon; disposing an etching resist on the metal layer; patterning the etching resist to expose areas of metal; contacting the exposed areas of metal with an etching composition to remove a portion of the exposed metal; and contacting the substrate with a stripping composition to remove the etching resist and the remaining exposed metal; wherein the substrate is an optically transparent substrate and wherein the stripping composition includes a polyhydric alcohol, water, a water-miscible amine and a polar solvent.

As used throughout this specification, the following abbreviations shall have the following meanings unless the context clearly indicates otherwise: g=gram; ° C.=degrees Centigrade; wt %=percent by weight; min.=minute; nm=nanometer; g=grams; mL=milliliter; DI=deionized; MP-diol=2-methyl-1,3-propanediol; DPM=dipropylene glycol monomethyl ether; AEEA=aminoethylaminoethanol; DMSO=dimethyl sulfoxide; TBC=tert-butylcatechol; BTA=benzotriazole; MIPA=monoisopropanolamine; PDO=1,3-propanediol; AMP=3-amino-1-propanol; and EDA=ethylenediamine. All percentages are by weight. All numerical ranges are inclusive and combinable in any order, except where it is clear that such numerical ranges are constrained to add up to 100%.

The terms "a" and "an" include the singular and the plural. The terms "stripping" and "removing" are used interchangeably throughout this specification. Likewise, the terms "stripper" and "remover" are used interchangeably. As used herein, "stripping" refers to the removal of an etching resist which contains polymeric material, such as a photoresist, and removal of remaining exposed metal from an optically transparent substrate after etching. The term "stripping" does not refer to the use of developers which remove unpolymerized photoresist and which define a pattern in the photoresist. "Alkyl" refers to linear, branched and cyclic alkyl. As used throughout this specification, the term "aprotic" refers to compounds that do not accept or yield a proton. The term "(meth)acrylic" refers to both methacrylic and acrylic. Likewise, the term "(meth)acrylate" refers to both methacrylate and acrylate.

In the manufacture of electronic display devices, patterned metal lines (or circuit traces) are disposed on an optical substrate. The term "optical substrate" or "optically transparent substrate" means any substrate having a $\geq 50\%$ transmittance of visible light. Typically, the optical substrate has a visible light transmittance of $\geq 75\%$ and more typically $\geq 90\%$. Visible light refers to the light having a wavelength in the range of 350 to 750 nm.

Optical substrates useful in the present invention may be organic, inorganic or organic-inorganic materials. Exemplary optical substrates include, but are not limited to, acrylic polymers, methacrylic polymers, polycarbonates, indium-tin-oxide ("ITO"), quartz, tin oxides, carbon nanotubes, glasses, silsesquioxanes, and siloxanes. Silsesquioxanes are polysilica materials having the general formula $(RSiO_{1.5})_n$. The R group is any organic radical such as alkyl, alkenyl and aryl. The organic radical may optionally be substituted, meaning that one or more of its hydrogens may be replaced by another group such as halogen, hydroxy or alkoxy. Suitable silsesquioxanes include, but are not limited to hydrogen silsesquioxane, alkyl silsesquioxane such as methyl silsesquioxane, aryl silsesquioxane such as phenyl silsesquioxane, and mixtures thereof, such as alkyl/hydrogen, aryl/hydrogen and alkyl/aryl silsesquioxane. Organic polymer optical substrates, such as those including a (meth)acrylic polymer, can be prepared by a variety of means, including that disclosed in U.S. Pat. No. 6,224,805 (Fields et al.). Other optical substrates are readily commercially available.

Optical substrates include optical and opto-electronic devices such as, but not limited to, display devices. As used herein, a "display device" refers to any display functioning off an electrode system. Exemplary display devices include, without limitation, liquid crystal displays ("LCDs"), headsup displays, plasma displays and light emitting polymer displays. Optical substrates also include light directing devices such as, but not limited to, waveguides, fiber optic cables, and optical packaging. Waveguides have a core material surrounded by a cladding material. Still other optical substrates include light emitting diodes ("LEDs") such as polymer LEDs ("PLEDs") and organic LEDs ("OLEDs").

In the manufacture of display devices, a metal layer is disposed on an optical substrate. The metal layer may be composed of a single metal or a metal alloy. Suitable alloys may be binary alloys, ternary alloys or may contain four or more metals. More than one metal layer may be used. In one embodiment, two metal layers are used. In another embodiment, three metal layers may be used. In a further embodiment, the metal layer contains a barrier metal layer and a bulk metal layer. The barrier metal layer is disposed between the bulk metal layer and the optical substrate. Such barrier metal layer typically functions to provide a barrier to the migration of metal from the bulk metal layer into the optical substrate which could cause shorts. The barrier metal layer may also function to improve adhesion of the bulk metal layer to the optical substrate. Further, the barrier metal layer may also function as a catalyst for the deposition of the bulk metal layer. The metal layer may have a total thickness of 10 to 2000 nm. Typically, the metal layer has a thickness in the range of 10 to 1000 nm.

The metal layer may be disposed by any suitable means such as by vapor deposition such as physical vapor deposition, sputtering, electroless deposition, electrolytic deposition, immersion plating, and screen printing of a metal-containing paste. Combinations of different methods may be used to deposit the metal layer on the optical substrate. For example, a barrier metal layer may be deposited by electroless metal plating and a bulk metal layer may be deposited on the barrier metal layer by electrolytic metal plating. Such metal deposition processes are well-known to those skilled in the art. One suitable method for depositing a metal layer is disclosed in European Patent Application EP 1693484.

Exemplary metals useful in forming the metal layers include, without limitation, aluminum, copper, silver, gold, nickel, tin, lead, molybdenum, cobalt, indium, platinum, palladium, tungsten, titanium, tantalum, tin-lead, tin-copper, tin-silver, tin-silver-copper and nickel-gold. Such metals may be further alloyed with a suitable alloying metal, such as, but not limited to, niobium, nitrogen, phosphorus, antimony and bismuth. More than one alloying metal may be used. In one embodiment, the metal layer is composed of a first metal layer or barrier layer and a second metal layer or bulk metal layer. In a particular embodiment, the bulk metal layer is copper and the barrier metal layer is any suitable barrier metal for copper such as molybdenum, titanium, titanium nitride, tungsten, tungsten nitride, tantalum or tantalum nitride. In a further embodiment, the metal layer is composed of a first metal layer (barrier metal layer) such as molybdenum, a second metal layer (bulk metal layer) such as copper, and a third metal layer (top metal layer) of molybdenum on the bulk metal layer. In another embodiment, the barrier metal layer and the top metal layer are composed of the same metal.

Electroless plating may suitably be accomplished by a variety of known methods. Suitable metals that can be electrolessly plated include, but are not limited to, copper, gold, silver, nickel, palladium, tin, and lead. Immersion plating may be accomplished by a variety of known methods. Gold, silver, tin and lead may suitably be deposited by immersion plating. Such electroless and immersion plating baths are well known to those skilled in the art and are generally commercially available from a variety of sources, such as Rohm and Haas Electronic Materials (Marlborough, Mass.)

Electrolytic plating may be accomplished by a variety of known methods. Exemplary metals that can be deposited electrolytically include, but are not limited to, copper, gold, silver, nickel, palladium, platinum, tin, tin-lead, tin-copper, tin-bismuth, tin-silver, and tin-silver-bismuth. Such electroplating baths are well known to those skilled in the art and are commercially available from a variety of sources, such as Rohm and Haas Electronic Materials.

After the metal layer is disposed on the optical substrate, it is typically patterned. In one embodiment of such patterning step, an etch resist is disposed on the metal layer. Such etch resist may be disposed on only selective areas on the metal layer that are not to be removed, or alternatively, may be disposed over the entire metal layer surface. Etch resists that are disposed over the entire metal layer surface are subsequently patterned to expose areas of the metal layer that are to be removed or etched away. Suitable etch resists may be applied as liquids, pastes or films. Application of the etch resist to selective areas of the metal layer may be by a variety of suitable means such as by screen printing and ink jetting. Application of the etch resist over the metal surface may be by any suitable means such as spin coating, roller coating, curtain coating, and by lamination using a dry film etch resist.

In general, the etch resist is composed of an organic polymeric material. Such etch resist may be applied to the metal layer as a polymeric composition, or may be applied to the metal layer as a composition containing monomers which are further polymerized to provide an organic polymeric material. In one embodiment, the etch resist is photoimageable, such as a photoresist. A wide variety of photoresists, both positive- and negative-acting, may be used, such as those commercially available from Rohm and Haas Electronic Materials. Such photoresists typically contain an organic binder polymer, a photoactive compound and a solvent.

When the etch resist is photoimageable, it is typically defined (or patterned) by exposing the etch resist to patterned actinic radiation. The photoimageable etch resist is exposed to actinic radiation of the appropriate wavelength (such as from 365 nm to 157 nm or shorter, EUV or e-beam) through a mask. Following irradiation, the exposed or unexposed portions of the photoimageable etch resist, depending upon whether the photoimageable etch resist is positive-acting or negative-acting, are removed by contacting the etch resist with a suitable developer. After development, areas of the metal layer are exposed upon removal of the etch resist to provide the desired pattern.

Once the etch resist is patterned, the exposed areas of the metal layer are contacted with a suitable etching composition to remove a portion of the metal layer. A wide variety of etching compositions may be used in the present invention. Selection of a particular etching composition is based in part on the particular metal or metals to be etched, the desired etching time, the particular optical substrate employed, the desired pH of the etching composition, the temperature at which the etching bath will be maintained, and the thickness of the metal layer to be removed, among other factors. The etchants useful in the present invention are chemical etchants, and may have a variety of pHs. Exemplary etchants have a pH in the range of 0.1-14, more typically in the range of 0.1-12, and still more typically in the range of 0.1-8.

Typically, the etchants include water, an oxidant, optionally one or more of an acid, a salt, a corrosion inhibitor and a surfactant, and may also include an organic solvent. A wide variety of oxidants are suitable. The choice of oxidant depends upon the metal to be removed and such selection is within the ability of those skilled in the art. Exemplary oxidants include, without limitation: peroxides such as hydrogen peroxide and organic peroxides such as tert-butyl hydroperoxide and benzoyl peroxide; peracids such as peracetic acid, perbenzoic acid; perchloric acid, periodic acid, potassium periodate, and perbromic acid; persulfate salts such as potassium persulfate and ammonium persulfate; peroxonitric acid; peroxomonosulfuric acid; peroxophosphoric acid; and hyponitrous acid. Mixtures of oxidants may be used. The amount of the oxidant in the etching composition may vary from 0.1 to 50 wt % or even greater. Typically, the oxidant is present in an amount from 0.1 to 20 wt %, more typically from 0.5 to 15 wt %, and still more typically from 0.5 to 10 wt %.

Any suitable acid may be used in the etchant compositions and may be inorganic or organic acids. Exemplary inorganic acids include, but are not limited to: hydrogen halides such as hydrochloric acid, hydrobromic acid, hydrofluoric acid, and hydroiodic acid; sulfuric acid; phosphoric acid; and nitric acid. Suitable organic acids include, without limitation, aliphatic acids such as those having from 1 to 15 carbons; alicyclic acids such as those having from 3 to 20 carbons; heterocyclic acids such as those having from 3 to 20 carbons and from 1 to 3 non-carbon atoms such as nitrogen, oxygen and sulfur; and aromatic acids, including heteroaromatic acids, such as those having from 5 to 20 carbon atoms. Exemplary organic acids include, but are not limited to, formic acid, acetic acid, propionic acid, butanoic acid, hexanoic acid, decanoic acid, oxalic acid, malic acid, malonic acid, succinic acid, adipic acid, suberic acid, acrylic acid, citric acid, tartaric acid, gluconic acid, ethylenediaminetetraacetic acid, cyclopentane carboxylic acid, cyclohexane carboxylic acid, cyclohexane dicarboxylic acid, benzoic acid, hydroxybenzoic acid, benzenedicarboxylic acid, pyridine carboxylic acid, furan carboxylic acid, and phenyldiacetic acid. More than one acid may be used and mixtures of organic and inorganic acids may be used. In one embodiment, the acid is an organic acid. In a further embodiment, the organic acid is a $(C_1-C_{15})$alkane carboxylic acid having from 1 to 4 carboxylic acid groups and more typically from 1 to 3 carboxylic acid groups. In another embodiment, the acid is a mixture of an organic acid and sulfuric acid. The acid may be used in the etchant compositions in an amount of 0 to 30 wt %, typically from 0.05 to 20 wt % and more typically from 0.05 to 10 wt %. Other suitable amounts are from 0.1 to 5 wt %, 0.2 to 5 wt % and 0.1 to 2 wt %.

Any suitable salt may be used in the etchant compositions. Such salts, which are typically neutral salts, may be added for a variety of purposes. Without being limited, exemplary salts include alkali metal halides, alkaline earth halides, potassium hydrogen sulfate, dipotassium hydrogen phosphate, and potassium dihydrogen phosphate. The amount of such salt will depend upon its use and is within the ability of those skilled in the art, but typically is from 0 to 10 wt %.

The optional corrosion inhibitors may be any that are suitable for use in the etchant compositions. Such corrosion inhibitors are well known to those skilled in the art and include, by way of example, triazoles, tetrazoles, imidazoles and catechols. The corrosion inhibitors may be used in an amount from 0 to 50 g/L. The selection of any optional surfactant is well within the ability of those skilled in the art. Such surfactant may be used in an amount from 0 to 2 wt %.

Exemplary solvents useful in the oxidant compositions include, without limitation; glycols such as ethylene glycol, diethylene glycol, triethylene glycol, propylene glycol, dipropylene glycol, diethylene glycol dimethyl ether, and diethylene glycol dibutyl ether; esters such as ethyl lactate and propylene glycol monomethyl ether acetate; and ketones such as acetone, butanone and heptanone. In one embodiment, a mixture of solvents is used. Such solvents may be present in the etchant compositions from 0 to 10 wt %.

In a particular embodiment, the etchant composition includes water, an oxidant and an acid. In another embodiment, the etchant composition includes water and two oxidants. In a further embodiment, the etchant composition includes water, two oxidants and an acid. In yet a further embodiment, the etchant composition includes water, an oxidant, an acid and a salt.

In general, the metal layer is contacted with the etching composition for a period of time sufficient to remove a desired portion of the metal layer. After etching, a small portion of the metal layer remains. Typically, the thickness of the metal layer remaining after etch is $\leq 10$ nm and typically is in the range of 0.5-10 nm. More typically, the thickness of the remaining metal layer is from $\leq 5$ nm and still more typically $\leq 3$ nm. Typically, the etching step removes $\geq 90\%$ of the thickness of the metal layer and more typically $\geq 95\%$. In one embodiment, the etching step removes a bulk metal layer and from 90-99.9% of a barrier metal layer. In a further embodiment, the etching step removes a bulk metal layer and from 95-99.9% of a barrier metal layer. In a particular embodiment, the metal layer includes a bulk metal layer such as copper which may be 200-350 nm in thickness and a barrier metal layer such as molybdenum which may be 35-50 nm in thickness. The etching step removes the bulk metal layer and a portion of the barrier metal layer, the remaining portion of the barrier layer having a thickness of $\leq 10$ nm. The etching time will vary depending upon the metal to be removed, the thickness of the metal, the particular etching composition used, the temperature of the etching composition and other factors. In general, the etching time is from 0.5 to 5 minutes and more typically from 1 to 3 minutes. Following etching, the substrate is optionally, but typically, rinsed with DI water and dried, such as in an oven or by contacting the substrate with a gas stream such as nitrogen.

Next, the etch resist and the remaining metal layer are removed by contacting the substrate with a stripping composition including a polyhydric alcohol, water, a water-miscible amines, and optionally a polar solvents. Suitable stripping compositions are those disclosed in U.S. Pat. No. 6,455,479 (Sahbari). "Polyhydric alcohol" refers to any alcohol having two or more hydroxy groups, such as, but not limited to $(C_2-C_{20})$alkanediols, $(C_2-C_{20})$alkanetriols, substituted $(C_2-C_{20})$alkanediols, and substituted $(C_2-C_{20})$alkanetriols. Suitable polyhydric alcohols include, without limitation, ethylene glycol, diethylene glycol, triethylene glycol, polyethylene glycol, propylene glycol, dipropylene glycol, tripropylene glycol, polypropylene glycol, 1,3-propanediol, 2-methyl-1,3-propanediol, butanediol, pentanediol, hexanediol, and glycerol. In one embodiment, the polyhydric alcohol is chosen from 1,3-propanediol, 2-methyl-1,3-propanediol, butanediol or glycerol, and more typically 1,3-propanediol and 2-methyl-1,3-propanediol. Mixtures of polyhydric alcohols may be used in the stripping compositions.

The polyhydric alcohols are typically present in the stripping composition in an amount of 5 to 65 wt %, based on the total weight of the composition. More typically, the polyhydric alcohols are present from 20 to 60 wt %, and yet more typically from 25 to 50 wt %. Such polyhydric alcohols are generally commercially available and may be used without further purification.

Any grade of water may be used in the present invention, such as deionized or distilled. Large amounts of water, such as up to 75 wt %, can be used in the stripping compositions. The amount of water is typically from 5 to 55 wt %, based on the total weight of the composition. More typical amounts of water are from 10 to 40 wt %, and still more typically from 10 to 35 wt %. A particularly suitable amount of water is from 5 to 50 wt %.

Any water-miscible amine may used in the present compositions. Suitable water-miscible amines include, but are not limited to: alkyleneamines such as ethylenediamine, diethylenetriamine, triethylenetetraamine and propylenediamine; and aminoalcohols such as aminoethylaminoethanol, ethanolamine, diethanolamine, triethanolamine, monoisopropanolamine, diisopropanolamine and 3-amino-1-propanol. Aminoethylaminoethanol, 3-amino-1-propanol, monoisopropanolamine and ethylenediamine are particularly suitable. In another embodiment, particularly suitable water-miscible amines are those capable of chelating one or more metal ions, such as ethylenediamine, diethylenetriamine, triethylenetetraamine and 3-amino-1-propanol. Mixtures of water-miscible amines may also be used.

The water-miscible amines are typically used in an amount of 5 to 65 wt %, based on the total weight of the composition. More typically, amounts of the water-miscible amines are from 10 to 60 wt % and yet more typically from 20 to 50 wt %. The water-miscible amines are generally commercially available, such as from Aldrich (Milwaukee, Wis.), and may be used without further purification.

Any polar solvent that is water-miscible and compatible with the stripping compositions may be used. Suitable polar solvents include polar aprotic solvents, dimethylformamide, dimethylacetamide, γ-butyrolactone and glycol ethers such as ($C_1$-$C_6$)alkyl ethers of ($C_2$-$C_{20}$)alkanediols and di($C_1$-$C_6$) alkyl ethers of ($C_2$-$C_{20}$)alkanediols. Suitable polar aprotic solvents include, but are not limited to, dimethyl sulfoxide and sulfolane. Such polar aprotic solvents are generally commercially available, such as from Aldrich (Milwaukee, Wis.), and may be used without further purification.

Exemplary glycol ethers include, but are not limited to, ethylene glycol monomethyl ether, diethylene glycol monomethyl ether, propylene glycol monomethyl ether, propylene glycol dimethyl ether, propylene glycol mono-n-butyl ether, dipropylene glycol monomethyl ether, dipropylene glycol dimethyl ether, dipropylene glycol mono-n-butyl ether, and tripropylene glycol monomethyl ether. Suitable glycol ethers are those sold under the DOWANOL tradename such as DOWANOL DPM, DOWANOL TPM, DOWANOL PNB, and DOWANOL DPNB all available from Dow Chemical Company (Midland, Mich.).

Typically, the polar solvent is used in the range of 5 to 50 wt %, based on the total weight of the stripping composition. More typically, the amount of polar solvent is in the range of 10 to 45 wt %, even more typically from 10 to 35 wt % and still more typically from 15 to 25 wt %.

Mixtures of polar solvents may be advantageously used in the stripping compositions. When a mixture of polar solvents is used, one solvent is typically chosen from diemthylsulfoxide, sulfolane and dipropylene glycol monomethyl ether. When more than one polar solvent is used such solvents may be combined in any weight ratio, such as from 99:1 to 1:99.

It will be appreciated by those skilled in the art that one or more secondary solvents may be used in the present compositions. Such secondary solvents include, but are not limited to, ($C_1$-$C_6$)alkylpyrrolidinones such as N-methylpyrrolidinone, N-ethylpyrrolidinone, N-hydroxyethylpyrrolidinone and N-cyclohexylpyrrolidinone.

Typically, as the amount of water increases above 20 wt %, the amount of metal corrosion increases. Such corrosion can be reduced through the use of a corrosion inhibitor. In an alternative embodiment, such corrosion can be reduced through the addition of a sulfur-containing polar solvent to the stripping composition. As the amount of water in the stripping composition increases, the amount of corrosion inhibitor, sulfur-containing polar solvent or both is typically increased, and more typically that the amount of sulfur-containing polar solvent is increased. Particularly useful stripping compositions include one or more corrosion inhibitors and one or more sulfur-containing polar solvents. Suitable corrosion inhibitors useful in the stripping compositions include, but are not limited to: catechol; ($C_1$-$C_6$)alkylcatechol such as methylcatechol, ethylcatechol and tert-butylcatechol; benzotriazole; ($C_1$-$C_{10}$)alkylbenzotriazoles; tetrazoles, imidazoles, benzimidazoles, gallic acid; and gallic acid esters such as methyl gallate and propyl gallate. In one embodiment, the corrosion inhibitor is chosen from catechol, ($C_1$-$C_6$)alkylcatechol, benzotriazole and ($C_1$-$C_{10}$)alkylbenzotriazoles such as tert-butylcatechol. When such optional corrosion inhibitors are used they are typically present in an amount of 0.01 to 10 wt %, based on the total weight of the stripping composition. More typically, the amount of corrosion inhibitor is from 0.2 to 5 wt %, still more typically 0.5 to 4 wt %, and yet more typically from 1.5 to 3 wt %. Generally, at least one corrosion inhibitor be used in the stripping compositions of the present invention. It will also be appreciated by those skilled in the art that more than one corrosion inhibitor may be advantageously used. Such corrosion inhibitors are generally commercially available from a variety of sources, such as Aldrich Chemical Company (Milwaukee, Wis.). Dimethylsulfoxide and sulfolane are suitable sulfur-containing polar solvents, but not the only such solvents that may be used.

The stripping compositions may optionally include one or more other components, such as wetting agents or surfactants, anti-freeze agents, and viscosity modifiers. Nonionic and anionic surfactants may be used with the stripping compositions, with nonionic surfactants being more typically used. Such surfactants are generally commercially available. Typically, such surfactants are used in an amount of from 0 to 5 wt %, more typically from 0.2 to 5 wt %, and even more typically from 0.5 to 3.5 wt %, based on the total weight of the composition.

Particularly suitable compositions include: from 5 to 65 wt % of a polyhydric alcohol chosen from 1,3-propanediol, 2-methyl-1,3-propanediol, butanediol and glycerol; from 5 to 40 wt % water; from 5 to 65 wt % of a water-miscible amines chosen from aminoethylaminoethanol, ethanolamine, diethanolamine, triethanolamine, monoisopropanolamine, diisopropanolamine, ethylenediamine, diethylenetriamine and triethylenetetraamine; from 5 to 50 wt % of a polar solvents chosen from dimethyl sulfoxide, sulfolane, ethylene glycol monomethyl ether, diethylene glycol monomethyl ether, propylene glycol monomethyl ether, propylene glycol dimethyl ether, propylene glycol mono-n-butyl ether, dipropylene glycol monomethyl ether, dipropylene glycol dimethyl ether, and dipropylene glycol mono-n-butyl ether; and from 0.2 to 5 wt % of a corrosion inhibitor. A suitable stripping composition is that marketed by Rohm and Haas Electronic Materials under the PRX-179 brand.

The compositions of the present invention may be prepared by combining the polyhydric alcohol, water, water-miscible amine, polar solvent and optional components such as corrosion inhibitors or wetting agents, in any order. Typically, the water-miscible amine is dissolved in a water and polyhydric alcohol mixture along with the polar solvent followed by and any optional components. Useful stripping compositions typically have a pH of $\geq 5$, more typically $\geq 7$, yet more typically from 8-12, and most typically from 9-11.

Typically, the stripping process may be carried out at any temperature, such as from room temperature up to 100° C., typically from 35° to 90° C., more typically from 50° C. to 85° C., and even more typically from 70° to 80° C.

The stripping compositions are effective for removing polymeric material such as the present etch resist from a substrate as well as removing the remaining exposed metal layer from the substrate. Polymeric residue on a substrate may be removed by contacting the substrate with a composition of the present invention. The substrate may be contacted with the compositions of the present invention by any known means, such as placing the substrate in a bath of the stripping composition, or by spraying the substrate with the stripping composition. Typically, the substrate is contacted with the stripping composition for a period of time sufficient to remove the etch resist and the remaining metal layer. Such time period depends upon the particular etch resist employed, the metal in the remaining metal layer, the particular stripping composition used, the temperature of the stripping composition as well as on other factors known to those skilled in the art. A typical time period for the stripping step is from 0.5 to 15 minutes, more typically from 0.5 to 5 minutes and even more typically from 1 to 3 minutes.

Following the stripping step, the substrate may optionally be rinsed, such as with DI water, and then optionally dried, such as in an oven or by a gas stream such as nitrogen. Typically, the substrate is rinsed and dried after the stripping step.

Accordingly, the present invention provides a method of manufacturing a display device including: providing a substrate having a metal layer disposed thereon; disposing an etching resist on the metal layer; patterning the etching resist to expose areas of metal; contacting the exposed areas of metal with an etching composition to remove a portion of the exposed metal; and contacting the substrate with a stripping composition to remove the etching resist and the remaining exposed metal; wherein the substrate is an optically transparent substrate and wherein the stripping composition includes a polyhydric alcohol, water, a water-miscible amine and a polar solvent.

An advantage of the process of the present invention is that the etch resist and remaining metal layer are effectively removed in a single process step. The present process also reduces the critical dimension ("CD") loss in a line in the manufacture of optical devices. For example, the CD loss using the present process is $\leq 1.5$ µm and typically $\leq 1$ µm in a 10 µm line. Another advantage of the present invention is that undercutting of the metal lines (circuit traces) is reduced. Further, when the present process is used, overetching of the optical substrate is reduced. A further advantage is that the optically transparent substrate has an optical transmittance after the stripping step that is within 10%, and more typically within 5%, of the optical transmittance before the metal layer is disposed on the substrate.

Conventional etchants used in the manufacture of display devices typically use hydrofluoric acid, which presents handling and safety issues. A still further advantage of the present invention is that the use of hydrofluoric acid in etchant compositions can be reduced or even eliminated.

The following examples are expected to illustrate aspects of the present invention.

EXAMPLE 1

The stripping compositions reported in the following table are expected to be effective in removing both etch resist and post etch metal layer residue.

| Sample | Composition |
|---|---|
| 1 | 25% MP-diol/38% AEEA/15% DPM/20% $H_2O$/2% TBC |
| 2 | 25% MP-diol/35% AEEA/20% DMSO/18% $H_2O$/2% TBC |
| 3 | 30% MP-diol/35% MIPA/18% DPM/15% $H_2O$/2% TBC |
| 4 | 30% MP-diol/30% AEEA/20% DPM/18% $H_2O$/2% BTA |
| 5 | 22% MP-diol/38% MIPA/15% Sulfolane/22.5% $H_2O$/2.5% BTA |
| 6 | 25% MP-diol/35% MIPA/18% DMSO/15% $H_2O$/2% BTA |
| 7 | 6% MP-diol/40% EDA/25% DMSO/25% $H_2O$/4% TBC |
| 8 | 6% MP-diol/45% EDA/25% DMSO/20% $H_2O$/4% TBC |
| 9 | 9% PDO/42% AMP/24% DMSO/22% $H_2O$/3% BTA |
| 10 | 5% MP-diol/35% EDA/30% DMSO/25% $H_2O$/5% TBC |
| 11 | 8% MP-diol/42% MIPA/22% Sulfolane/24% $H_2O$/4% BTA |
| 12 | 6% PDO/40% EDA/25% DMSO/25% $H_2O$/4% TBC |
| 13 | 5% MP-diol/30% EDA/35% DMSO/25% $H_2O$/5% TBC |
| 14 | 10% MP-diol/40% AEEA/22% DMSO/25% $H_2O$/3% TBC |
| 15 | 10% MP-diol/40% AEEA/22% DMSO/25% $H_2O$/1% TBC/2% BTA |
| 16 | 12.5% MP-diol/10% DMSO/10% EDA/35% AEEA/30% $H_2O$/2.5% BTA |

EXAMPLE 2

An optical substrate of borosilicate glass and containing metal layer composed of a molybdenum barrier on the glass and a copper bulk layer on the barrier layer is provided. A liquid photoresist is applied to the metal layer and is patterned by exposing the photoresist to an appropriate wavelength of actinic radiation through a mask and then developing the exposed photoresist. Exposed areas of the metal layer are provided after the patterning step. Next, the metal layer is contacted with a 1 wt % peracetic acid-containing etching composition for 2-3 min. at 25° C. to remove a portion of the exposed metal layer. It is expected that all of the copper bulk layer and all but approximately 5 nm of the barrier layer are removed. The substrate is then rinsed with DI water for 2 min. Next, the remaining exposed metal layer is immersed in Sample 15 of Example 1 for 1 min. at 70-90° C. After this, the substrate is rinsed with DI water for 2 min. and hot air dried at 60-70° C. Both the photoresist (etch resist) and the remaining exposed metal layer are expected to be removed.

EXAMPLE 3

The procedure of Example 2 is repeated a number of times except that Sample 15 is replaced by each of Sample 3, Sample 4, Sample 9, Sample 10, Sample 11 and Sample 12. Similar results to Example 2 are expected each time.

EXAMPLE 4

An optical substrate of borosilicate glass and containing metal layer composed of a molybdenum barrier on the glass and a copper bulk layer on the barrier layer is provided. A photoresist is applied to the metal layer and is patterned by exposing the photoresist to an appropriate wavelength of actinic radiation through a mask and then developing the exposed photoresist. In order to more effectively evaluate the light transmittance of the samples, the photoresist is next removed using any suitable photoresist stripper. The entire metal layer is next contacted with a 1 wt % peracetic acid-containing etching composition for 2-3 min. at 25° C. to remove the metal layer. It is expected that all of the copper bulk layer and all but approximately 5 nm of the barrier layer are removed. The substrate is then rinsed with DI water for 2 min. and is then dried. The visible light transmittance of the etched samples is next determined using a Hach 2000 Spectrophotometer at a wavelength of 400 nm. Next, the sample is immersed in Sample 15 of Example 1 for 1 min. at the various temperatures listed in the following table. After this, the substrate is rinsed with DI water for 2 min. and hot air dried at 60-70° C. After this stripping step, the visible light transmittance is again measured as described above. The light transmittance ("% T") data are reported in the following table.

| % T After Etch & Before Stripping | % T After Stripping |
|---|---|
| At 60° C. | |
| 90.84 | 91.45 |
| 95.38 | 96.41 |
| At 65° C. | |
| 93.0 | 98.6 |
| 76.5 | 83.2 |
| At 70° C. | |
| 32.8 | 35.7 |
| 81.1 | 99.2 |
| 81.8 | 99.6 |
| 88.3 | 99.6 |
| 87.4 | 99.3 |
| 83.1 | 99.8 |
| 84.5 | 99.9 |

The above data clearly show that the stripping step of the present invention is able to remove remaining metal after the etching step.

What is claimed is:

1. A method of etching a metal layer comprising: providing a substrate having a metal layer disposed thereon; disposing an etching resist on the metal layer; patterning the etching resist to expose areas of metal; contacting the exposed areas of metal with a wet etching composition to remove a portion of the exposed metal; and contacting the substrate with a stripping composition to remove the etching resist and the remaining exposed metal; wherein the substrate is an optically transparent substrate and wherein the stripping composition comprises 5 to 65 wt % of a polyhydric alcohol, 5 to 55 wt % water, 5 to 65 wt % of a water-miscible amine and 5 to 50 wt % of a polar solvent, wherein the water-miscible amine is chosen from alkyleneamines and aminoalcohols, and wherein the polar solvent is chosen from polar aprotic solvents, dimethylformamide, dimethylacetamide, γ-butyrolactone and glycol ethers.

2. The method of claim 1 wherein the optically transparent substrate has a visible, light transmittance of $\geq 75\%$.

3. The method of claim 1 wherein the optically transparent substrate has an optical transmittance after the stripping step that is within 10% of the optical transmittance before the metal layer is disposed on the substrate.

4. The method of claim 1 wherein the stripping composition further comprises a solvent chosen from $(C_1-C_6)$alkylpyrrolidones.

5. The method of claim 1 wherein the metal layer further comprises a barrier metal layer and a bulk metal layer.

6. The method of claim 5 wherein the bulk metal layer and 95-99.9% of the thickness of the barrier metal layer are removed in the etching step.

7. The method of claim 5 wherein the barrier metal layer is chosen from molybdenum, titanium, titanium nitride, tungsten, tungsten nitride, tantalum and tantalum nitride.

8. The method of claim 5 wherein the metal layer further comprises a top metal layer on the bulk metal layer.

9. The method of claim 8 wherein the barrier metal layer and the top metal layer comprises the same metal.

10. The method of claim 9 wherein the barrier metal layer and the top metal layer comprises molybdenum.

11. A method of manufacturing a display device comprising: providing a substrate having a metal layer disposed thereon; disposing an etching resist on the metal layer; patterning the etching resist to expose areas of metal; contacting the exposed areas of metal with an etching composition to remove a portion of the exposed metal; and contacting the substrate with a stripping composition to remove the etching resist and the remaining exposed metal; wherein the substrate is an optically transparent substrate and wherein the stripping composition comprises 5 to 65 wt % of a polyhydric alcohol, 5 to 55 wt % water, 5 to 65 wt % of a water-miscible amine and 5 to 50 wt % of a polar solvent, wherein the water-miscible amine is chosen from alkyleneamines and aminoalcohols, and wherein the polar solvent is chosen from polar aprotic solvents, dimethylformamide, dimethylacetamide, γ-butyrolactone and glycol ethers.

12. A method of etching a metal layer comprising: providing a substrate having a metal layer disposed thereon; disposing an etching resist on the metal layer; patterning the etching resist to expose areas of metal; contacting the exposed areas of metal with a wet etching composition to remove a portion of the exposed metal; and contacting the substrate with a stripping composition to remove the etching resist and the remaining exposed metal; wherein the substrate is an optically transparent substrate and wherein the stripping composition comprises from 5 to 65 wt % of a polyhydric alcohol chosen from 1,3-propanediol, 2-methyl-1,3-propanediol, butanediol and glycerol; from 5 to 40 wt % water; from 5 to 65 wt % of a water-miscible amine chosen from amino ethylaminoethanol, ethanolamine, diethanolamine, triethanolamine, monoisopropanol amine, diisopropanolamine, ethyl enediamine, diethylenetriamine and triethylenetetraamine; from 5 to 50 wt % of a polar solvent chosen from dimethyl sulfoxide, sulfolane, ethylene glycol monomethyl ether, diethylene glycol monomethyl ether, propylene glycol monomethyl ether, propylene glycol dimethyl ether, propylene glycol mono-n-butyl ether, dipropylene glycol monomethyl ether, dipropylene glycol dimethyl ether, and dipropylene glycol mono-n-butyl ether; and from 0.2 to 5 wt % of a corrosion inhibitor.

13. The method of claim 12 wherein the stripping composition further comprises one or more components chosen from surfactants, anti-freeze agents and viscosity modifiers.

14. The method of claim 12 wherein the stripping composition has a pH $\geq 5$.

15. The method of claim 14 wherein the stripping composition has a pH $\geq 7$.

* * * * *